Sept. 26, 1967 W. W. CLEMENTS 3,344,377
ELECTROMAGNETIC ACTUATOR HAVING PLURAL PLUNGER MEMBERS
Filed Sept. 9, 1965

United States Patent Office 3,344,377
Patented Sept. 26, 1967

3,344,377
ELECTROMAGNETIC ACTUATOR HAVING PLURAL PLUNGER MEMBERS
Warner W. Clements, Los Angeles, Calif.
(13435 Java Drive, Beverly Hills, Calif. 90210)
Filed Sept. 9, 1965, Ser. No. 486,065
2 Claims. (Cl. 335—259)

The invention relates to electromagnetic actuators which will exert their electromagnetic pull in either of two directions, and which, if repetitively energized for finite periods, will automatically pull first in one direction and then in the other. There is no generally accepted name for actuators of this class. They might well be called "two-way, self-reversing electromagnetic actuators," this being the most descriptive term of any reasonable length.

There being very few prior art actuators which fit in the class delineated, the relevent prior art may be fairly represented by just two references. These are: 2,595,285, O'Brien et al., May 6, 1952; 2,972,091, Clements, Feb. 14, 1961.

Both of these references teach devices which utilize the solenoid-and-plunger principle of harnessing electromagnetic force (such teaching being inter alia in the case of the Clements reference). To gain the two-way action, a central plunger is effectively lengthened in either of two directions by the temporary joinder to it of one or the other of two plunger extender segments provided for the purpose. The plunger extender segments must necessarily be disposed at opposite ends of the solenoid and must each travel inward in the solenoid only at such times as it is temporarily extensive of the central segment. But the unimpeded effect of the electromagnetic force of the solenoid is to draw all three plunger segments into the interior of the solenoid. The two references cited differ, among other respects, in their teaching as to how the one of the two extender segments which is unused at a given time is to be prevented from being attracted inward. O'Brien teaches the use of mechanical catches or pawls for this purpose. The Clements reference teaches that the unused segment is to be rigidly yoked to the other extender segment, so that when that one which is currently extending the central segment travels inward with the latter, then the other one cannot go in, but actually goes out.

Both of these prior-art arrangements have limitations. The O'Brien arrangement cannot be used where simplicity, very long life, or extreme reliability are required, because the mechanical restraining components represent complication and sources of wear and possible malfunction. The prior-art Clements arrangement, on the other hand, is not well adapted for use where very long strokes are required; the fact that extender segments operationally go outward as well as inward from their quiescent positions makes the overall longitudinal space required impractically large when the stroke exceeds a certain length.

The present disclosure teaches a third arrangement for keeping that extender segment which is non-employed at a given instant from moving inward of the solenoid. It is an arrangement radically different from those cited. I have discovered that biasing means alone, without the use of rigid restraints on or connections to the affected segment, can be made to serve the purpose. According to my invention, no catches, pawls, dogs, yokes or the like are required; thus there is little mechanical complication, and there is no source for wear or potential malfunction other than those sources that can be found in the simplest, one-way, solenoid-and-plunger devices.

Drawings

Figure 1:
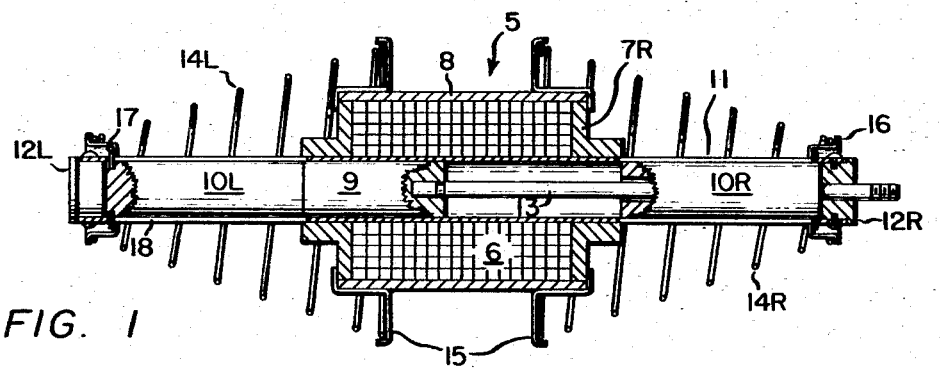
FIG. 1 is a central sectional view of a first embodiment of my invention. Those central parts which, being round and relatively small, are not shown sectioned, are nevertheless shown broken away where necessary to reveal inner detail.
Figure 2:
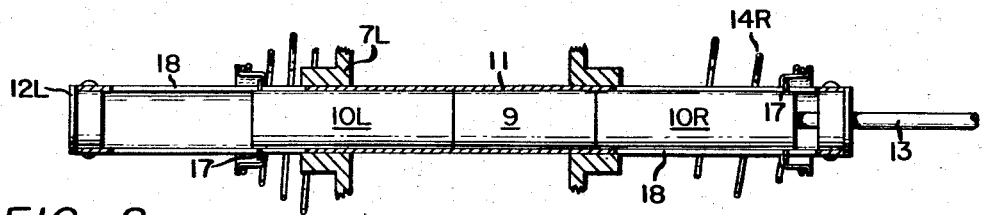
FIGS. 2 and 3 show the central parts of the embodiment of FIG. 1 in identical aspect, but in moved position.
Figure 3:
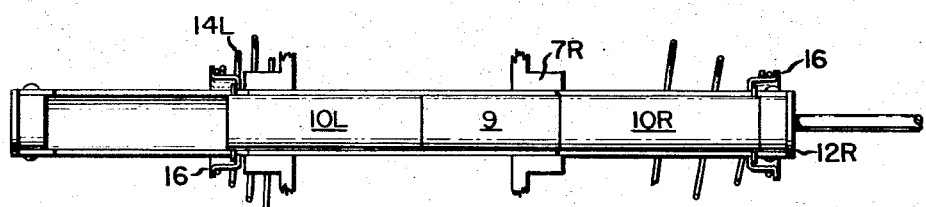
Figure 4:
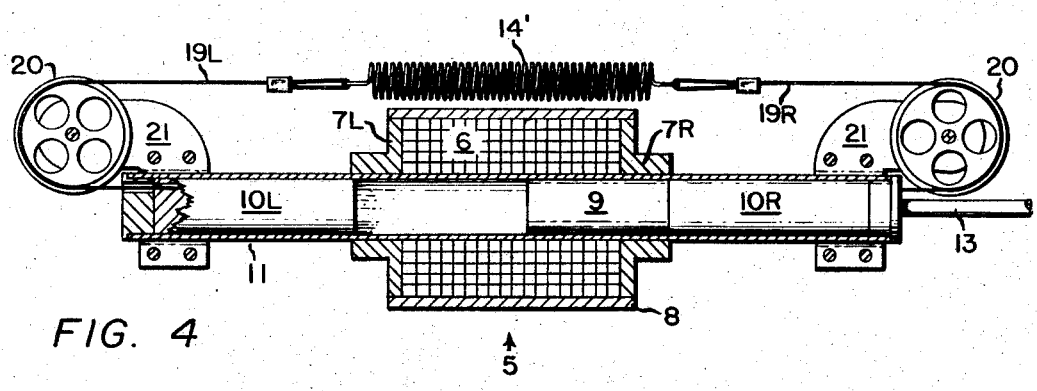
FIG. 4 is a central sectional view of a second embodiment according to my invention. Small central parts are shown respectively sectioned, non-sectioned, and broken away.

The magnetic parts in the FIG. 4 device are identical with those in the FIGS. 1–3 device. The respective moved positions of the three plunger segments in the four figures depict a sequence which represents one-half of a complete operating cycle. Starting with FIG. 1, these segments are shown as they would appear with the device in one of its two quiescent positions. In FIG. 2, segments appear as they would with coil energized and central segment near the end of its stroke to the right. In FIG. 3, segments appear as they would with stroke of central segment completed, but with coil still energized. In FIG. 4, segments appear as they would with coil again de-energized, and segments in the second of their two quiescent positions.

In connection with the drawings, it should be mentioned that devices according to the invention may have a much longer stroke (in proportion to radial dimensions) than has the device depicted. But drawings which would illustrate such a longer stroke would differ from the instant ones only in being considerably "stretched out" in directions crosswise of the sheets. Such stretching would require a smaller scale, and thus obscure essential detail, without teaching anything additional.

Construction

Except where stated, the following description of construction applies to both embodiments illustrated.

The solenoid is indicated generally at 5. Coil 6 has two terminals through which said coil may be supplied with current from an external electrical source; although said terminals are not specifically shown, their presence is to be implied. The solenoid illustrated is of the so-called "iron-clad" type ("iron" in this term of art being something of a misnomer, inasmuch as certain silicon steels, for instance, will work as well as iron). That is to say, besides the coil, the solenoid includes fixed magnetic structure comprising pole pieces 7L and 7R, along with outer case 8. For purposes of the invention, the fixed magnetic structure is highly desirable, but not absolutely essential. Therefore, it should be carefully noted that I use the term "solenoid" as generic to "iron-clad solenoid" and "non-iron-clad solenoid."

Central plunger segment 9 and plunger extender segments 10L and 10R are mounted so as to each independently slide longitudinally along the axis of the solenoid. In the illustrative embodiment the particular means of mounting these parts to permit the designated movement is tube 11 (which should be made of non-magnetic material). However, the particular mounting means chosen is not material to the invention; the sliding rod arrangement of the cited references would, for instance, serve as well.

Besides the options regarding inclusion or non-inclusion of fixed magnetic structure and the mounting of the plunger segments, any other design variations whose counterparts are conventionally found in solenoid-and-plunger-type actuator construction are permissible and fully equivalent to that shown. In particular, embodiments of the invention designed for heavy-duty A.C. operation would feature plunger segments of laminated construction, and hence of rectangular cross-section. The hole through the solenoid would be similarly rectangular in section in order to accommodate the segments. The fixed magnetic structure would be also laminated and would surround the coil on only two sides instead of all sides. All this is in full accordance with prior-art practice; the required adaptation is within the skills of the ordinary practitioner of the art.

Stop means are required for keeping the two plunger extender segments from travelling outward beyond the point where their respective inner ends generally communicate with the respective outer ends of the solenoid, as shown by FIGS. 1 and 4. Any stop means which will serve this end will suffice for the purposes of the invention. In the illustrative embodiment, the means are represented by tube plugs 12L and 12R. These plugs are permanently affixed in the respective ends of the tube. It should be noted that, given the construction already described, the travel of the central plunger segment is automatically limited, since when going in either direction it must eventually encounter an extender segment, and the latter must eventually encounter a stop.

Obviously, the purpose of an actuator is to actuate. Accordingly, some means is required for harnessing the movements of the plunger segments to perform useful tasks. Since the central segment is shifted in one direction when the solenoid is energized a first time, and is shifted in a second direction when the solenoid is energized a second time, it will usually be said central segment whose motion it will be desirable to transmit. For such purposes, the illustrative embodiment incorporates a shaft 13 which is affixed firmly at its inner end to the central segment. (Joinder, in the illustrative embodiment, is by means of inserting the shaft in a drilled hole in the segment, and staking. However, any appropriate method would suffice.) The shaft extends to the right, through a bore through the center of segment 10R dimensioned to clear it, and through a hole in plug 12R dimensioned so that said plug serves as a bearing for the shaft. The outer (right-hand, in the drawings) end of the shaft is threaded or otherwise so-treated that an external mechanical load may be conveniently connected to it.

It should not be overlooked that, for certain limited, special purposes, the motions of the extender segments might also (or instead) be harnessed. A given segment will make an impulsive inward movement every second time the solenoid is electrically impulsed.

Finally, some means is required for biasing the plunger extender segments respectively outward against their stops. In the particular embodiment of FIGS. 1–3, two springs 14L and 14R, along with their mounting components, serve this purpose. Each spring is compressively stressed (that is, it tends to spread or expand). Each bears against a fixed inner retainer, 15 and a movable outer retainer, 16. The outer retainers slide freely on tube 11. They are connected to respective extender segments by pins 17, which pins are firmly driven into the segments at their radially inner ends, and are engaged by the retainers at their outer ends. The pins pass through the tube by means of slots 18 which are provided for the purpose, said slots being made long enough so that there is no interference with the longitudinal travel of the plunger segments.

Besides the arrangment described, any differing arrangement which similarly resiliently biases the extender segments outward will serve the purposes of the invention (and provide a full equivalent of the arrangement described), provided only that the means be such that the degree of the bias can be set within reasonably close limits. There exist in the prior art pneumatic, gravity, and permanent-magnet biasing arrangements which are the full equivalents of spring arrangements, and which could be adapted by artisans of ordinary skills in the course of applying the present invention.

In the embodiment of FIG. 4 the biasing means is somewhat different. Here there is only one spring, 14'. This spring is connected to both plunger extender segments by cables 19L and 19R, which cables run from respective spring ends, around pulleys 20, through holes in plugs 12 (which holes clear said cables without interference), and to the respective extender segments. In the illustrative embodiment the cables are fastened to the segments by being inserted in small holes drilled in the latter, wtih soft-metal plugs being driven in beside them. The pulleys, meanwhile, are mounted to tube 11 by means of brackets 21. Spring 14' is initially stretched somewhat, so that it tends to hold both of the affected segments against their stops. A particular and inventive feature of this arrangement is that the position of either segment will affect the degree of tension exerted on the other.

The illustrative embodiment whose construction has just been described are particularly suited for actuation of the kind of a load that inherently "stays put" after it has been actuated in either direction. If a load consistently tends to be unstable in a given direction, it can generally be transformed into a "stay-put" load by means of balancing the instability with a spring or weight. However, some loads to which an actuator might be applied are unstable in *both* directions, by virtue of forces such as vibration which would tend to dislodge them from either between-actuations (quiescent) position. The embodiments described would do nothing to prevent such dislodging, and would not operate properly in its presence. In such a situation a bistable biasing device would be required to be added for purpose of holding the central plunger and its connected load in either of their extreme position in the face of the dislodging forces. But while such a biasing device might well be built into the actuator proper, it does not form a part of the inventive combination, since that combination will function (in other cirumstances) in its complete absence. The provision of such a device, where required, is within the abilities of the skilled mechanic. The "toggle spring" of the O'Brien reference herein cited is one form it might take.

*Operation*

With movable parts in their positions of FIG. 1, central plunger segment 9 and extender segment 10L together form, in effect, one long plunger, said plunger being the magnetic equivalent of the one-piece plungers found in the one-way devices of the prior art. If the solenoid be energized (by supplying its coil with electric current), this equivalent plunger will be magnetically urged to the observer's right. It should be noted that in a long-stroke device such as that shown, the force operative upon the plunger for the greater part of the stroke is not an attraction for the opposite pole-piece 7R. Rather, it is an electromagnetic effect due to reaction of that flux which "flows" directly from plunger to outer case with the current in the windings in the coil.

The bias of spring 14L would tend to prevent any movement of extender segment 10L to the right. But the tension of this spring is deliberately set to be insufficient to resist the segment's tendency to stick magnetically to the central segment, once in contact with the latter under solenoid-energized conditions. This tendency to stick is initially substantial and grows very strong, indeed, as the stroke of the virtual single elongated plunger progresses to the right. Thus, even though the force of the spring is increased as it is further compressed by the movement, the force does not increase as fast as the sticking tendency, and the virtual plunger will continue to act steadfastly as one unit until the cessation of energization.

Meanwhile, there is also an electromagnetic force which would tend to draw the other extender segment, 10R, into the solenoid. If this latter segment were permitted to respond to said force at this early stage of the sequence, it would jump inward and join the other segments to make a virtual plunger so long that said plunger would not be impelled in either direction by magnetic forces, and hence would not go anywhere. Spring 14R (as mounted and connected) has the sole responsibility for keeping segment 10R stationary until the stroke of the other segments to the right is nearly completed. This clearly involves making spring 14R strong enough so that it will resist the initial forces on its segment. But, on the other hand, spring 14R cannot, as a practical matter, be made stronger than spring 14L. The device is a symmetrical one, and the next half-cycle of operation will require that spring 14R play the part currently being played by spring 14L. In other words, the right-hand spring must not be made so strong that it will prevent its respective extender segment from sticking to the plunger segment when the time comes for it to do so.

Fortunately, there is a substantial difference in the forces involved, so the setting of spring tension is not critical. The force compelling an extender segment to stick to the central segment, once in contact with the latter, is quite high. Meanwhile, the force on the idle segment is initially quite small. It increases throughout the stroke as the central segment approaches it, but its rate of increase is at first small, with the greatest increase concentrated at the very end of the stroke. In any case, the attraction to the central segment of an extender actually in contact with it is substantially greater than that of an extender which is merely nearby. To provide a substantial margin for error, the spring is set at such a tension that its respective extender will not hold its position until the bitter end of the stroke, but will jump in to meet the oncoming central segment just prior to the end of the stroke. The situation wherein this has just occurred is shown in FIG. 2. In this situation, the solenoid is still energized, the two left-hand segments are still travelling to the right, and have just collided with the right-hand segment, which they will carry along with them until they hit tube plug 12R and come to a halt. When this last event has transpired, the situation will be that of FIG. 3, in which it is assumed that solenoid is still energized, although movement of parts has come to a halt.

There is no magnetic "attraction" operative upon the extra-long virtual plunger of FIGS. 2 and 3 in either of its positions in those figures. What carries the assembly from the one position to the other is the high momentum that two of the segments have acquired in their trip from the far end of the solenoid. (In case there is a bistable biasing means incorporated for holding load in its quiescent positioning, as previously mentioned might be necessary, such a biasing means could be depended upon, even in the total absence of momentum, for completing a nearly-completed stroke in either direction.)

Although there is no magnetic attraction upon the assembled segments in their halted positions of FIG. 3, there is one small force operative by virtue of the fact that spring 14L, being more highly compressed, will overbalance the force of spring 14R. If the system were frictionless, the segments would thus be carried back leftward to a neutral position, all stuck together (energization of the solenoid still persisting). However, it should be understood that the forces exerted by these springs are at most very small by comparison with the large forces which the device exerts through shaft 13 to move its load. Any load consonant with the latter force will normally have enough static friction to alone prevent any backsliding of the type just described. If it does not, or if it is otherwise not stable in its quiescent positions, then the bistable biasing device already mentioned can be installed.

As the final step in the half-cycle sequence of operation, the solenoid is de-energized and the tendency of the plunger segments to stick together consequently vanishes (or nearly so). The two right-hand segments are at that point under no urging to move anywhere, but extender segment 10L will be urged by spring 14L to move to its leftward extreme. When it has done so, the situation will be that of FIG. 4, in which movable parts are represented in the second of their two quiescent positioning arrangements. It will be noted that the latter situation represents the mirror image of the situation of FIG. 1. In other words, movable parts are similarly arranged but for the transposition of left and right.

In summary, the effect of energizing the solenoid of the embodiment for a sufficient period (usually very brief, amounting to the application of an ampulse) and then de-energizing it is to shift the movable parts from their respective positions of FIG. 1 to their respective positions of FIG. 4. It follows that energizing and de-energizing a second time will move said parts from their FIG. 4 positions back to their FIG. 1 positions, the intermediate stages placing said parts in the positioning of the mirror images of FIGS. 2 and 3.

Operation of the embodiment of FIG. 4 is fully comparable to the operation of the embodiment of FIGS. 1–3, just described. An understanding of the one will follow from an understanding of the other. However, there are certain operational advantages to the arrangement of FIG. 4 to which attention should be called:

First of all, the situation of one spring overbalancing another cannot arise. For instance, at the end of the stroke with solenoid still energized (the situation corresponding with that of FIG. 3), there will be no tendency of the extender-biasing system to displace the three-piece virtual plunger in one direction or the other.

Second, since the FIG. 4 arrangement brings about an increased bias on the inactive extender segment as the other segments approach it, the tendency for displacement of the inactive segment as the power stroke approaches its end is greatly decreased.

It should be understood that the cables, pulleys, and brackets of FIG. 4 are mere design details and have little to do in a direct sense with the benefits just described. With most devices that use springs, usually a modification is apparent according to which the spring may be deformed (stressed) by compression instead of by stretch, and still produce identical biasing results. The same is true in the instant case. Readers with ordinary mechanical skills will immediately see that the function of spring 14' could as well be served by a coil spring completely surrounding the device (necessitating supporting said device by its ends) and bearing outward on the extender segments by means similar to retainers 16 and pins 17 in the earlier figures. Such an arrangement would be the full equivalent of the one shown, and there exist other equivalents. What the improvement really teaches is the deforming of a two-terminus spring from each of its termini independently, by inward motion of the respective extender segments, so that the force on one of the latter is related to the force on the other.

*Ancillary definitions*

I take "longitudinal" as meaning in the directions of the axis of the solenoid in a given case. Where a part is permitted only longitudinal motion, it follows that if I refer to "inward" or "outward" movement of that part, I mean inward or outward longitudinally.

When I speak of extender segments hitting, contacting, or being in contact with the central segment, I do not mean to limit the circumstances to immediate contact between the magnetic metals of the respective segments. I fully contemplate that there might, in certain circumstances, be thin, non-magnetic "bumpers" installed between the respective parts to prevent work-hardening of the magnetic materials from impact, and/or to cut down any tendency of said parts to stick under quiescent conditions because of residual magnetism.

I define a "spring" as any structure designed to be capable of substantially elastic deformation. By a "two-terminus" spring, I mean one adapted to exert equal and opposing force on two termini (drive points) so that deformation of said spring is due solely to movement of said termini relative to each other.

By the "ends" of a plunger segment, I mean its terminations in the longitudinal sense just defined; this applies irrespective of any particular shape a segment may take.

What I claim is:

1. An electromagnetic actuator comprising:
   a solenoid;

two plunger extender segments mounted for independent longitudinal motion along the axis of the solenoid in and out of the hole through said solenoid from respective ends thereof;

means for independently limiting respective outward travel of the plunger extender segments to extreme positioning wherein each of said segments has its inner end generally communicating with a respective outer end of the solenoid;

a central plunger segment mounted between the plunger extender segments for longitudinal motion substantially within the hole through the solenoid;

means for selectively controlling the tendency of the plunger extender segments to be attracted inward when the solenoid is energized, said means consisting entirely of biasing means arranged to resiliently urge each segment outward toward the limits of its permitted travel;

and means for making connection between at least one of the plunger segments and any appropriate external apparatus.

2. An electromagnetic actuator comprising:

a solenoid;

two plunger extender segments mounted for independent longitudinal motion along the axis of the solenoid in and out of the hole through said solenoid from respective ends thereof;

means for independently limiting respective outward travel of the plunger extender segments to extreme positioning wherein each of said segments has its inner end generally communicating with a respective outer end of the solenoid;

a central plunger segment mounted between the plunger extender segments for longitudinal motion substantially within the hole through the solenoid;

means for selectively controlling the tendency of the plunger extender segments to be attracted inward when the solenoid is energized, said means consisting entirely of a two-terminus spring and means for deforming said spring from one terminus in response to inward movement of one of said segments and for deforming said spring from the other terminus in response to the inward movement of the other of said segments, whereby each segment is urged outward toward the extreme limit of its permitted travel with a force modified according to the instantaneous positioning of the other segment;

and means for making connection between at least one of the plunger segments and any appropriate external apparatus.

References Cited

UNITED STATES PATENTS 2,515,258  7/1950  O'Brien et al. _____ 335—259 X

BERNARD A. GILHEANY, Primary Examiner.

C. HARRIS, Jr., Assistant Examiner.